July 20, 1943.          W. E. WOODINGTON          2,324,661
COMBINATION FLASHLIGHT AND TESTING DEVICE
Filed Aug. 24, 1940
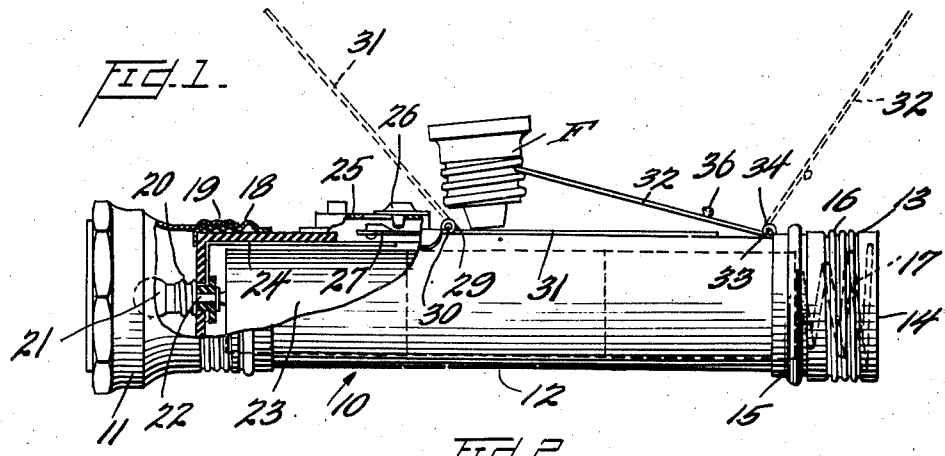
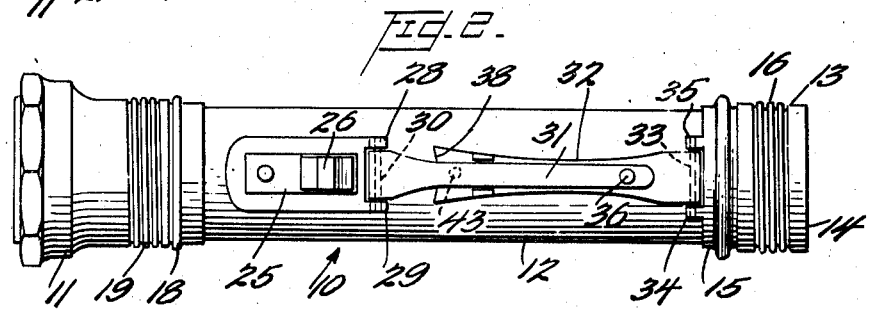
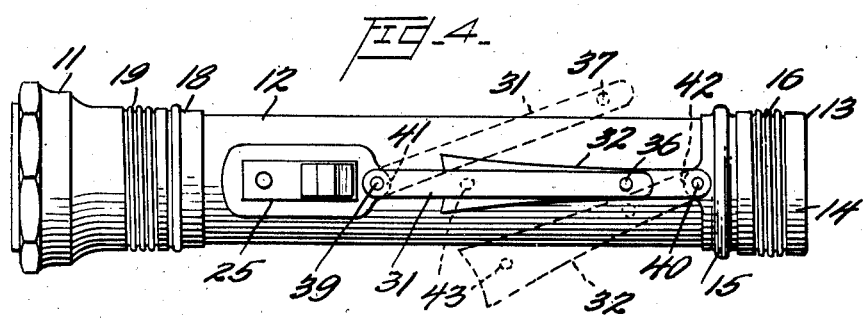
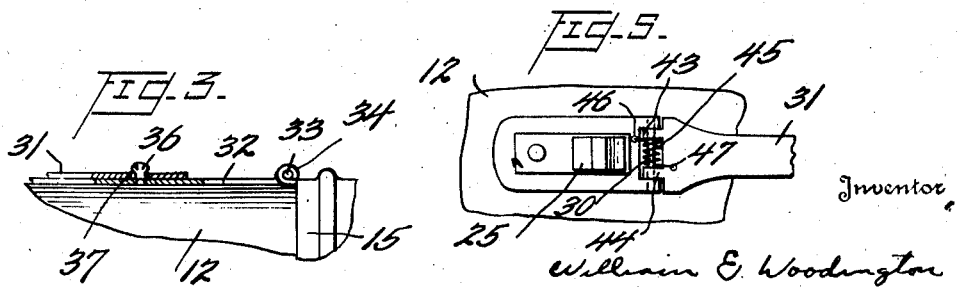
Inventor
William E. Woodington
By Ivan P. Tashof,
Attorney Patented July 20, 1943

2,324,661

UNITED STATES PATENT OFFICE 2,324,661

COMBINATION FLASHLIGHT AND TESTING DEVICE

William E. Woodington, Washington, D. C.

Application August 24, 1940, Serial No. 354,140

11 Claims. (Cl. 175—183)

The present invention relates to a combination flashlight and testing device. More particularly, the present invention relates to an improved form of flashlight which is capable of functioning as a testing member for circuits, fuses, and similar electrical devices capable of normally conducting a current supplied by the dry cell battery of an ordinary flashlight.

Stated differently, the present testing device is capable of use in the testing not only of fuses, but of electrical circuits embodied in switchboards, lamp circuits and other types of electrical circuits.

The only limitation on the testing function of the present device is that the circuit shall have a resistance sufficiently low to pass a current of the potential supplied by the ordinary dry cell battery or relatively small number of dry cell batteries in series.

Obviously, the present device cannot be used for testing circuits having relatively high resistances. However, it is desired to point out that it may be used to test portions of these types of circuit by by-passing or shorting these resistances.

Although devices of this general character, principally for the testing of fuses, are known in the prior art, it is desired to point out that substantially all of these devices considerably modify the ordinary characteristics of the flashlight so as to make it rather a cumbersome and impractical article for ordinary use. Most of these devices involved considerable modification of the ordinary flashlight and greatly increased the cost of manufacture thereof. Further, in most of these prior art testing devices, a lack of flexibility was apparent. Thus, those testing devices designed to test the ordinary screw threaded type of fuse were incapable of testing the tubular type of fuses commonly used in the relatively high potential electrical circuit and/or switchboard. These prior art testing devices were also incapable of use for the testing of a circuit since the distance between the testing terminals was often inflexible and incapable of expansion or contraction.

It is one of the objects of the present invention therefore, to provide a combination flashlight and testing device involving a relatively simple modification of the ordinary flashlight.

Another object of the present invention is to provide a testing device having a maximum flexibility of operation.

Still another object of the present invention is to provide a combination flashlight and testing device which is capable of being used as an ordinary flashlight and free from any bulky or inconvenient appendages.

A fourth object of the present invention is to provide a flashlight casing with a swinging conducting member in circuit with the battery and bulb thereof, and normally in circuit closing position and in close proximity to the flashlight casing, but capable of being swung away from the flashlight casing to provide a testing gap.

A fifth object of the present invention is to provide, in a device of the character described, a pair of swinging arms normally in contact with one another to complete a battery circuit but capable of being swung away from one another to provide a variable gap for the insertion of a conducting member to be tested.

A sixth object of the present invention is to provide, in a device of the character described, a pair of swinging conducting members in circuit with the operating members of an ordinary flashlight, said arms being capable of pivotal movement away from the casing of a flashlight in order to provide a testing gap, said arms having means cooperating therewith to retain them in close proximity to the flashlight casing.

A seventh object of the present invention is to provide, in a device of the character described, a pair of swinging conducting arms adapted to be snap fastened together to provide a conducting member for the normal operating circuit of a flashlight, and to be swung apart to provide a testing gap.

An eighth object of the present invention is to provide a testing arm swingable toward and from a flashlight casing with a widened arcuate portion adapted to conform to the periphery of a fuse.

A ninth object of the present invention is to provide a pivoted testing arm of the character described with a spring member adapted to retain the same in circuit closing position.

Other objects and advantages of the present invention will be apparent from the drawing and description of the present invention, wherein:

Figure 1 is a side elevation of a flashlight and testing device according to the present invention, partly in section, Figure 2 is a plan view of the flashlight of Figure 1 showing the arms in closed position, Figure 3 is a detail, partly in section, of the snap fastener for the conducting arms, Figure 4 is a plan view of a modification of the present invention provided with a modified hinge, Figure 5 is a detail of a second modified form of hinge.

Referring to Figure 1, a flashlight is indicated in general by the reference numeral 10. The flashlight 10 is provided with the conventional lens assembly 11, intermediate casing section 12 and threaded annulus 13. The casing 12 is preferably made of an insulating material such as fibre, and the lens assembly 11, as well as the annulus 13, is preferably of a suitable metal, as for example, brass.

The annulus 13 consists of two parts, 14 and 15, which are joined together, as for example by a suitable screw thread 16 in a manner well known in the art. The member 14 constitutes a closure cap for the rear end of a flashlight casing. The closure cap 14 preferably carries the conventional spring member 17 indicated in dotted lines in Figure 1 which is adapted to establish a contact between the cap 14 and the rear end of the rearward dry cell carried within the casing.

The forward end of the fibre casing 12 carries a screw threaded annular metal portion 18 to which the lens assembly 11 is screwed as by the threaded portion 19. The forward end of the casing 12 also carries a lamp socket 20 which is adapted to receive an ordinary flashlight lamp or bulb 21. This lamp socket is provided with the conventional two terminals cooperating with two terminals of the lamp. One of these terminals, indicated at 22, cooperates with the forward terminal of the foremost battery 23, while the other terminal is connected as by means of conducting member 24 to one side of a switch 25. The switch 25 includes the usual slide 26 which serves to establish a contact between members 27 and 24 when moved in a forward direction. The member 27 is suitably connected to the conducting casing of the switch 26.

The rearward end of the switch casing also carries a pair of ears 28 and 29. The ears 28 and 29 in turn carry a pivot member 30 having pivoted thereon a conducting arm 31. The arm 31 is adapted to lie snugly against the casing 12 when in closed position and capable of approximately 180° pivotal movement away from the casing. Another conducting arm 32 is carried by a pivot 33 which is in turn carried by the ears 34 and 35. These ears are formed integrally with the annulus portion 15 at the rearward end of the casing.

It is to be noted that the arm 32 is also capable of approximately 180° pivotal movement toward and away from the casing 12. The arm 32 carries an upstanding male portion of a snap fastener indicated at 36, and the arm 31 is provided with an opening 37 which is adapted to snap over the male member 36.

As shown in Fig. 2, the two portions of the snap fastener are joined together and the arms 31 and 32 are firmly fastened to form a single conducting member. With the switch closed therefore, a circuit is established between the lamp 21 and the battery through the outer portion 20, conducting member 24, conducting member 27, the members 31 and 32, the annulus portion 15, the rear cap 14 and the spring 17 to the rearward terminal of the rearward battery, and through the battery to the forward terminal 23 and the other terminal of the lamp socket 22. Since this circuit is contingent on forward movement of the switch slide 26, it is apparent that the flashlight will then function in an ordinary manner. If the switch however, is maintained in the on or forward position and the conducting arms 31 and 32 are opened toward the outward position, the circuit will be broken in the conducting arms and the variable gap is produced into which any conducting member which is sought to be tested can be inserted.

In Figure 1, the arm 31 is shown in a downward position and the arm 32 in contact with one side of a socket type fuse F. It is to be noted that the arm 32 is provided with a widened arcuate portion 38 which is adapted to conform to the periphery or outer terminal of a standard fuse F. It is obvious that for the simple testing of a fuse of this character, one of the arms may be omitted, and the other terminal of the testing circuit constituted by either the annular portion 15 or by the casing of the switch 25. However, in the preferred form of the device, two arms are provided with the advantages hereinbefore mentioned.

Although the casing 12 has been shown as made of an insulating material, it is obvious that it may be made of a metal or conducting material.

Referring to the modifications disclosed in Figure 4, it will be noted that two arms 31 and 32 are provided which are similar in general to the arms 31 and 32 of Figures 1 and 2. These arms however, are provided at one of their ends with an opening adapted to receive a rivet or pivots 39 and 40 respectively. The pivots 39 and 40 are received in suitable extension portions 41 and 42 which are formed on the casing of the switch 25 and annular portion 15 respectively.

It will thus be seen that in this modification, the arms 31 and 32 are adapted to swing transversely to the switch casing. They may be used therefore, to provide a variable gap for testing purposes in a manner entirely similar to the pivoted arms of Figures 1 and 2. The arms 31 and 32 of Figure 4 are similarly provided with a fastening portion 36 and an opening 37 which function entirely similarly to the similar members in Figures 1 and 2. Obviously, other means for providing for the swinging motion of the arms relative to the casing may be provided. Thus, the relatively stiff arms may be joined to the casing members i. e. the switch and annular portion by means of a flexible section, or they may be made entirely of flexible material.

In addition to the opening 37, another opening 43 may be provided in the arm 32. The openings 37 and 43 may be utilized to attach conducting members to the arms for additional testing purposes.

In the modification shown in Figure 5, a spring hinge is shown for one of the conducting members 31. As shown in Figure 5, the rear end of the member 31 is forked to provide two lugs 43 and 44. Wound about the pivot 30 is a spring 45 which is anchored at one end on the switch member 25, as at 46, and anchored at the other end on the arm 31, as at 47. The spring 45 is so arranged therefore, that it normally tends to keep the arm 31 against the casing. A similar type of spring pivot may be provided for the arm 32 and the snap fastener 37 omitted.

It is obvious therefore, that there has been provided a combination testing device and flashlight which, when not in use as a testing device, takes a convenient and practical form. Inasmuch as the arms 31 and 32 are held tightly against the casing, the entire device presents pretty much the appearance of a conventional flashlight when not in use for testing purposes.

Although as shown and described, the flashlight incorporated in the present device is provided with an insulating fibre casing, and consequently the various metal members of the assembly are insulated from one another and from the conducting portions of the battery. As before stated, it is within the broad scope of the present invention to provide a casing of metal or other conducting materials. Obviously, when the casing is so constructed, suitable insulation for the conducting arms 30 and 31, and particularly the pivots of these arms, is necessary, and it is to be understood that the flashlight of the present invention may be constructed of metal throughout and the various members of the electrical circuit involved suitably insulated where necessary from one another.

What is claimed is:

1. In a combination flashlight and testing device including an elongated casing, a battery in said casing, a lamp and means to connect one terminal of said lamp to one of the terminals of said battery, a pair of relatively long conducting arms longitudinally disposed relative to said casing carried on longitudinally spaced portions of said casing at one of their ends, and adapted to be swung away from said casing at the other of their ends, and means to connect the casing ends of said arms to a second terminal of said battery and a second terminal of said lamp respectively, said arms being so proportioned and positioned on said casing that they contact one another to connect said second lamp terminal with said second battery terminal when the free ends of the arms are positioned in close proximity to said casing.

2. In a combination flashlight and testing device including a lamp and a battery in circuit with one another and a casing, a pair of relatively long conducting arms in said circuit longitudinally disposed relative to said casing and swingably connected to longitudinally spaced portions of said casing at one of their ends, said arms being adapted to close said circuit when swung into close proximity to said casing and to break said circuit when swung away from said casing, and means to retain said arms in circuit closing position.

3. In a combination flashlight and testing device including a lamp and a battery in circuit with one another and an elongated casing, a pair of elongated conducting arms in said circuit pivoted to longitudinally spaced pivots on said casing at one of their ends and having the other of their ends free, said arms being adapted to close said circuit when pivoted into close proximity to said casing and into contact at their free ends and adapted to break said circuit when pivoted away from said casing and means to retain said arms in circuit closing position.

4. In a combination flashlight and testing device including a lamp and a battery in circuit with one another and an elongated casing, a pair of elongated conducting arms in said circuit pivoted to longitudinally spaced pivots on said casing at one of their ends and having the other of their ends free, said arms being adapted to close said circuit when pivoted into close proximity to said casing and into contact at their free ends and adapted to break said circuit when pivoted away from said casing and snap fastening means carried by the free ends of said arms adapted to cooperate to fasten said arms together in close proximity to said casing.

5. In a combination flashlight and testing device including a lamp and a battery in circuit with one another and an elongated casing, a pair of elongated conducting arms in said circuit pivoted to longitudinally spaced pivots on said casing at one of their ends and having the other of their ends free, said arms being adapted to close said circuit when pivoted into close proximity to said casing and into contact at their free ends and adapted to break said circuit when pivoted away from said casing and spring means cooperating with the pivoted ends of said arms, said spring means being adapted to retain said arms in close proximity to said casing.

6. In a combination flashlight and testing device including a lamp and a battery in circuit with one another and a casing, a switch member in said circuit positioned on said casing, an annular member in said circuit positioned at the rear end of said casing, a pair of pivot members carried by said switch member and said annular member and a pair of conducting arms respectively pivoted at one of their ends to the pivot on said switch member and the pivot on said annular member, and adapted to be swung away from said casing at their free ends, said conducting arms being adapted to close said circuit when swung into close proximity to said casing and open said circuit when moved away from said casing and means to retain said arms in close proximity to said casing to close said lamp circuit.

7. In a combination flashlight and testing device including a lamp and a battery in circuit with one another and an elongated casing, a conducting portion at the rear of said casing interposed in said circuit, a second conducting portion on said casing spaced from said first conducting portion, and means to connect said portions including an elongated conducting arm swingably connected to said casing at one of its ends, and extending longitudinally of said casing, said arm being adapted to bridge said portions to close said circuit when swung into close proximity to said casing and break said circuit when swung away from said casing.

8. In a combination flashlight and testing device including a lamp and a battery in circuit with one another and an elongated casing, a switch member carried by said casing intermediate the ends thereof, a conducting portion at the rear of said casing spaced from said switch member and interposed in said circuit, and means to connect said conducting portion and switch member including a relatively long conducting arm pivoted to said switch member extending longitudinally of said casing and adapted to bridge said portion and switch member to close said circuit when swung into close proximity to said casing, and break said circuit when swung away from said casing.

9. In a combination flashlight and testing device including a lamp and a battery in circuit with one another and an elongated casing, a pair of relatively long conducting arms in said circuit, extending longitudinally of said casing and swingably connected to said casing at one of their ends, said arms being adapted to close said circuit when swung into close proximity to said casing and break said circuit when swung away from said casing and a widened arcuate portion on one of said arms adapted to fit the periphery of a member to be tested.

10. In a combination flashlight and testing device including a lamp and a battery in circuit with one another and a casing, a switch member carried on said casing intermediate the ends thereof, a conducting annulus at the rear end of said casing, a pair of pivoted members carried by said switching member and said annulus, a pair of conducting arms each having one of their ends pivoted to the pivot members on the switch member and annulus respectively, a male portion of a snap fastener carried by one of said arms and a female portion of a snap fastener carried by the other of said arms, said portions being adapted to cooperate to fasten said arms together in proximity to said casing to close the aforementioned circuit.

11. In a combination flashlight and testing device including a lamp and a battery in circuit with one another and a casing, a switch member carried on said casing intermediate the ends thereof, a conducting anuulus at the rear end of said casing, a pair of pivot members carried by said switch member and said annulus, a pair of conducting arms each having one of their ends pivoted to the pivot members on the switch member and annulus respectively and a pair of springs about the pivots of said arms and adapted to retain said arms in close proximtiy to said casing and in contact with one another.

WILLIAM E. WOODINGTON.